United States Patent
Brooks et al.

(10) Patent No.: US 6,388,873 B1
(45) Date of Patent: May 14, 2002

(54) DISK DRIVE INCLUDING RESILIENT SECURING SYSTEM PROVIDING RELATIVE MOVEMENT BETWEEN SIDE RAILS AND HEAD DISK ASSEMBLY TO ACCOMMODATE SIDE RAILS ENGAGING GUIDE CHANNELS IN A CHASSIS

(75) Inventors: Peter E. Brooks; Lance A. Gabrielson, both of Rochester, MN (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/378,291

(22) Filed: Aug. 20, 1999

(51) Int. Cl.[7] ................................................. H05K 5/02
(52) U.S. Cl. ....................... 361/685; 361/683; 361/724; 361/727; 312/223.1; 312/223.2; 439/928.1; 248/535; 248/534
(58) Field of Search .................... 361/685, 683, 361/684, 724, 725, 726, 727; 312/223.1, 223.2; 439/53, 928.1; 248/65, 73, 534, 535

(56) References Cited

U.S. PATENT DOCUMENTS

| 5,098,175 A | * | 3/1992 | Cooke et al. ............. 312/341.1 |
| 5,668,696 A | * | 9/1997 | Schmitt ....................... 361/685 |
| 5,683,159 A | * | 11/1997 | Johnson .................... 312/334.7 |
| 6,058,016 A | * | 5/2000 | Anderson et al. ........... 361/727 |
| 6,069,789 A | * | 5/2000 | Jung ........................... 361/684 |
| 6,288,902 B1 | * | 9/2001 | Kim et al. ................... 361/725 |
| 6,297,962 B1 | * | 10/2001 | Johnson et al. ............. 361/726 |
| 6,299,266 B1 | * | 10/2001 | Justice et al. ............ 312/223.2 |
| 6,320,744 B1 | * | 11/2001 | Sullivan et al. ............. 361/785 |

* cited by examiner

Primary Examiner—Darren Schuberg
Assistant Examiner—David Foster
(74) Attorney, Agent, or Firm—Milad G Shara

(57) ABSTRACT

A disk drive is usable in a chassis having first and second guide channels mounted on side surfaces of the chassis. The disk drive includes a head disk assembly that includes first and second side walls. The disk drive further includes first and second side rails and a securing system for securing the side rails to the side walls. The first and second side rails engage the first and second guide channels, respectively, for supporting the disk drive within the chassis. The securing system includes an engagement mechanism and a double-sided adhesive resilient mechanism. The engagement mechanism projects between the first and second side rails and the first and second side walls, respectively, of the head disk assembly. The double-sided adhesive resilient mechanism is adhesively attached between the first side rail and the first side wall and between the second side rail and the second side wall for mounting the first and second side rails to the first and second side walls, respectively, of the head disk assembly. The securing system provides for relative movement between the side rails and the side walls to accommodate the side rails engaging the guide channels in the chassis. In one embodiment, the relative movement is a damped relative movement.

21 Claims, 7 Drawing Sheets

DISK DRIVE INCLUDING RESILIENT SECURING SYSTEM PROVIDING RELATIVE MOVEMENT BETWEEN SIDE RAILS AND HEAD DISK ASSEMBLY TO ACCOMMODATE SIDE RAILS ENGAGING GUIDE CHANNELS IN A CHASSIS

BACKGROUND OF THE INVENTION

1. Field of the Invention

The present invention relates to hard disk drives. More particularly, this invention relates to a disk drive including a resilient securing system providing relative movement between side rails and head disk assembly to accommodate side rails engaging guide channels in a chassis.

2. Description of the Prior Art and Related Information

A huge market exists for mass-market host computer systems such as servers, desktop computers, and laptop computers. To be competitive in this market, a hard disk drive must be relatively inexpensive and must accordingly embody a design that is adapted for low cost mass production. In addition, it must provide substantial capacity, rapid access to data, and reliable performance. Numerous manufacturers compete in this expansive market and collectively conduct substantial research and development, at great annual cost, to design and develop innovative hard disk drives to meet increasingly demanding customer requirements.

Each of the various contemporary mass-marketed hard disk drive models provides relatively large data storage capacity, often in excess of 1 gigabyte per drive. To this end, there exists substantial competitive pressure to develop mass-market hard disk drives that have even higher capacities and that provide rapid access to stored data. Another requirement to be competitive in this market is that the hard disk drive must conform to a selected standard exterior size and shape often referred to as a "form factor". Generally, capacity is desirably increased without increasing the form factor, or the form factor is reduced without decreasing capacity.

Satisfying these competing constraints of low-cost, small size, high capacity, and rapid access requires innovation in each of numerous components or subassemblies. Typically, the main subassemblies of a hard disk drive are a head disk assembly and a printed circuit board assembly.

The head disk assembly includes an enclosure including a base and a cover; at least one disk having at least one recording surface; a spindle motor causing each disk to rotate; and an actuator arrangement. The actuator arrangement includes a separate transducer for each recording surface, and is movable to position each transducer relative to the recording surface. The printed circuit board assembly includes circuitry for processing signals and controlling operation of the drive.

The head disk assembly includes a pair of side rails that are mounted to side walls of the enclosure. These side rails are received within guide channels mounted to side surfaces of a chassis into which the hard disk drive is to be inserted. To mount the hard disk drive in the chassis, the side rails of the hard disk drive need to be aligned with the guide channels. Next, the hard disk drive is slid into the chassis such that the side rails of the head disk assembly ride on the guide channels of the chassis. Upon full insertion of the hard disk drive in the chassis, a printed circuit board (PCB) electrical/data connector of the printed circuit board assembly engages a corresponding PCB electrical/data connector on a motherboard or backplane wall of the chassis. A latch arrangement associated with the side rails and guide channels secures the head disk assembly and thereby the hard disk drive within the chassis.

To mount the side rails to the side walls of the head disk assembly, the head disk assembly and a first side rail of the pair of side rails are placed into an assembly jig. The assembly jig aligns fastener openings in the first side rail with threaded fastener apertures in the side wall of the head disk assembly. The threaded fasteners are inserted through the fastener openings in the side rail and then screwed into the threaded fastener apertures. Once the fasteners are appropriately tightened and the first side rail is secured, the assembly jig is flipped 180°, and the above process is repeated with the second side rail on the opposite side wall of the head disk assembly thereby completing the side rail mounting process. As such, the process of mounting the side rails to the side walls of the head disk assembly can be a time consuming process that results in higher costs for assembling the hard disk drive. Moreover, since the side rail mounting process entails the use of two side rails and at least four threaded fasteners, the cost of providing these components can further increase the cost of the hard disk drive.

While the jig assembly helps to ensure that the side rails are properly aligned (i.e., parallel) with one another, the guide channels of the chassis may not be properly aligned. Unaligned (i.e., non-parallel) guide channels within the chassis may make it difficult to align and insert the side rails of the head disk assembly with and into the guide channels of the chassis. Moreover, since the threaded fasteners secure the side rails to the side walls of the head disk assembly in a fixed position, the side rails can only accommodate (i.e., tolerate) a minute amount of guide channel misalignment. As such, unaligned guide channels can result in a hard disk drive that is virtually impossible to mount within the chassis without some modification of the alignment of the side rails, the guide channels or both. Even if the unaligned guide channels can accept the side rails so that the hard disk drive can be mounted in the chassis, this misalignment can result in unwanted stresses on the side rails and guide channels that may result in hard disk drive affecting failure of one or more of these components.

When both the side rails and the guide channels are properly aligned, insertion of the hard disk drive into the chassis can be accomplished. However, in order to reduce manufacturing costs, the side rails and the guide rails are not manufactured to a high degree of precision. As such, once the hard disk drive is inserted into the chassis some "play" (i.e., movement) may exist between the side rails and the guide channels as a result of this imprecision when manufacturing these components. This "play", whether side-to-side or up-down, that exits between the side rails and the guide channels can degrade performance of the hard disk drive. Performance of the hard disk drive can be affected by vibration, caused by operation of other components within the chassis, of the hard disk drive that is a result of the play between the side rails and the guide rails. This vibration can be caused by undesirable imbalance in the disk stack and during actuator seeking. Vibration of the hard disk drive can affect performance of the hard disk drive itself and can produce undesirable acoustic noise (i.e., buzzing sound). Moreover, operation of the hard disk drive itself together with the "play" between the side rails and the guide rails can produce mechanical energy that can cause operation and performance affecting vibration in other components such as other disk drives within the chassis.

Accordingly, there is a need for an improved system for mounting side rails to the side walls of a head disk assembly of a hard disk drive. In particular, there is a need for a side rail mounting system that employs less components and reduces the time for mounting the side rails to the head disk assembly, thereby resulting in assembly time and cost savings. In addition the side rail mounting system should improve side rail to guide channel fit so as to reduce play between the side rails and guide channels and acoustic energy. Moreover, the side rail mounting system should be capable of accommodating (i.e., tolerating) some degree of guide channel and/or side rail misalignment (i.e., non-parallelism) so that the hard disk drive can be inserted into the chassis when this condition exists. Lastly, the side rail mounting system should be able to dampen vibration and/or isolate the hard disk drive from vibration so that performance of the hard disk drive is not adversely affected.

SUMMARY OF THE INVENTION

The invention can be regarded as a disk drive that is usable in a chassis having first and second guide channels mounted on side surfaces of the chassis for supporting the head disk assembly within the chassis. The disk drive includes a head disk assembly including first and second side walls, first and second side rails, and a securing system for securing the side rails to the side walls. The first and second side rails engage the first and second guide channels, respectively, on the side surfaces of the chassis for supporting the disk drive within the chassis. The securing system includes an engagement means and a double-sided adhesive resilient means. The engagement means protrudes between the first and second side rails and the first and second side walls, respectively, of the head disk assembly. The double-sided adhesive resilient means is adhesively attached between the first side rail and the first side wall and between the second side rail and the second side wall for mounting the first and second side rails to the first and second side walls, respectively, of the head disk assembly. The securing system provides for relative movement between the side rails and the side walls to accommodate the side rails engaging the guide channels in the chassis.

The engagement means and the double-sided adhesive resilient means of the securing system employs less components and reduces the time for mounting the side rails to the head disk assembly of the disk drive resulting in assembly time and cost savings. In addition the securing system improves side rail to guide channel fit by reducing play between the side rails and guide rails and acoustic energy. Moreover, the side rail securing system is capable of accommodating (i.e., tolerating) some degree of guide channel and/or side rail misalignment (i.e., non-parallelism) so that the disk drive can be inserted into the chassis when this condition exists. Lastly, the securing system dampens vibration and isolates the head disk assembly from vibration so that operation and performance of the head disk assembly are not adversely affected.

DETAILED DESCRIPTION OF A PREFERRED EMBODIMENT

Figure 1:
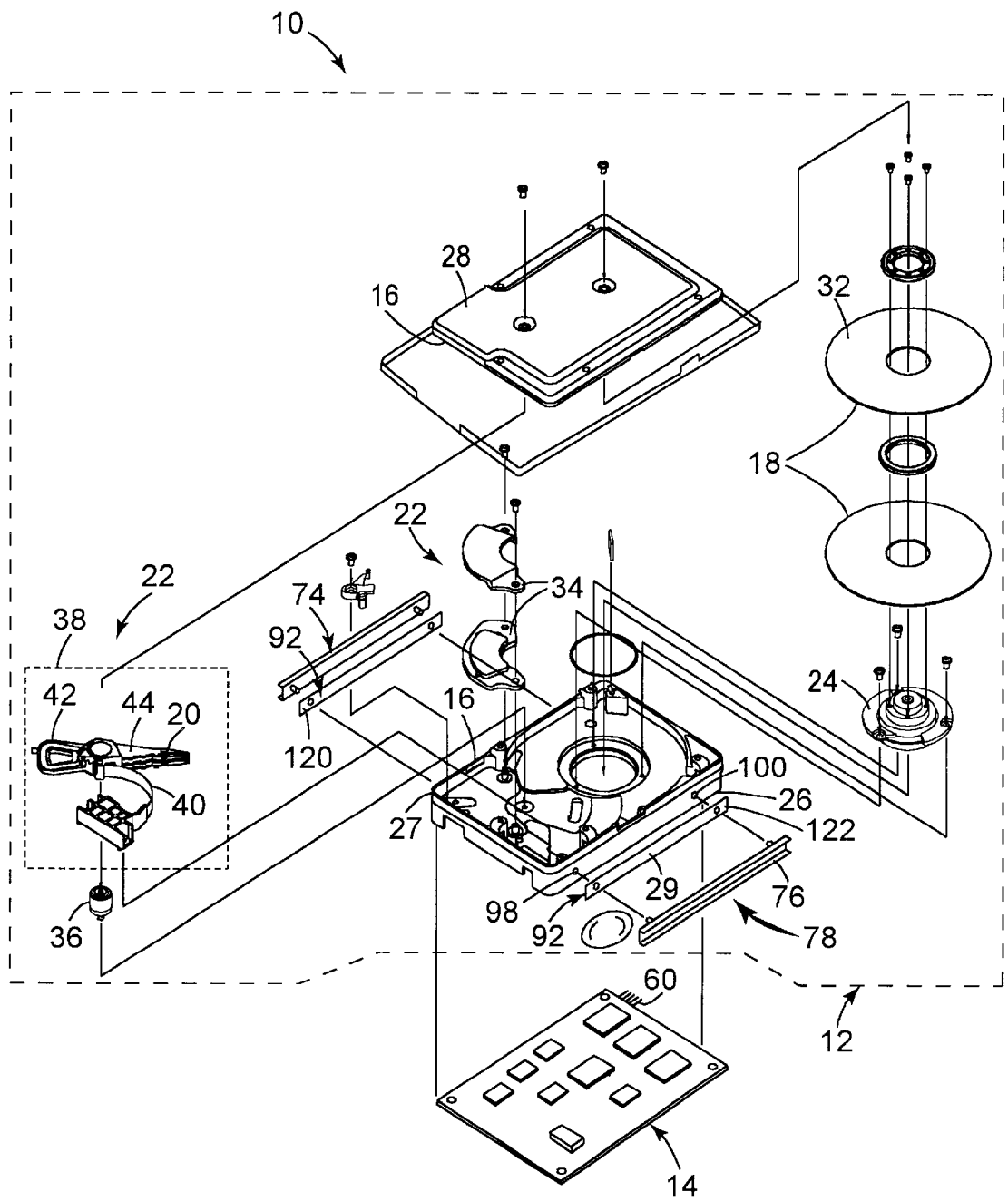
FIG. 1 is an exploded view of a hard disk drive including a head disk assembly, side rails, and a securing system that provides relative movement between the side rails and the head disk assembly to accommodate the side rails engaging guide channels in a chassis.

As shown in FIG. 1, a hard disk drive 10 embodying one preferred embodiment of the present invention includes a head disk assembly 12 and a printed circuit board assembly 14. The printed circuit board assembly 14 is suitably secured to an exterior of the head disk assembly 12 and controls operation of various components thereof.

The head disk assembly 12 includes an enclosure 16, a magnetic disk 18, a magnetic transducer 20, a rotary actuator arrangement 22, and a spindle motor generally indicated at 24. As described in greater detail below, the magnetic disk 18, the magnetic transducer 20, the rotary actuator arrangement 22 and the spindle motor 24 are maintained within the enclosure 16.

The enclosure 16 comprises a base 26 and a cover 28. The base 26 defines first and second side walls 27 and 29, respectively, of the head disk assembly 12 of the hard disk drive 10. The enclosure 16 is sealed to provide a relatively contaminant-free interior for remaining components of the head disk assembly 12.

The magnetic disk 18 and the magnetic transducer 20 are positioned within an interior of the enclosure 16. The magnetic disk 18 includes a recording surface 32. For example, in one preferred embodiment, the magnetic disk 18 has a substrate formed from aluminum, with the recording surface including magnetic material deposited on the aluminum substrate. The particular embodiment shown in FIG. 1 includes a stack of two disks 18 providing four recording surfaces 32, and includes four magnetic transducers 20. Of course, the number of disks 18 may be less than or greater than 2. The number of transducers 20 corresponds with the number of disks 18.

The rotary actuator arrangement 22 provides for positioning of the magnetic transducers 20 over a selected area of the recording surfaces 32 of the magnetic disks 18. The rotary actuator arrangement 22 includes a permanent-magnet arrangement generally indicated at 34, a pivot bearing cartridge 36 and a head stack assembly 38. The pivot bearing cartridge 36 includes a stationary shaft secured to the enclosure 16 to define an axis of rotation for the rotary actuator arrangement 22. The head stack assembly 38 includes a flex circuit assembly 40, a coil 42 and actuator arms 44. Each one of the magnetic transducers 20 is secured to a respective one of the arms 44. During use, circuitry (not shown) causes current to conduct through the coil 42, and because the coil 42 lies in the magnetic field provided by the permanent magnet arrangement 34, a torque is applied to the head stack assembly 38. The amount and direction of that torque is subject to control by a servo system that controls the rotary position of the magnetic transducer 20 relative to the respective recording surface 32 of the magnetic disk 18. The disk 18 is mounted to the spindle motor 24 and causes each disk 18 to spin, preferably at a constant angular velocity.

Figure 2A:
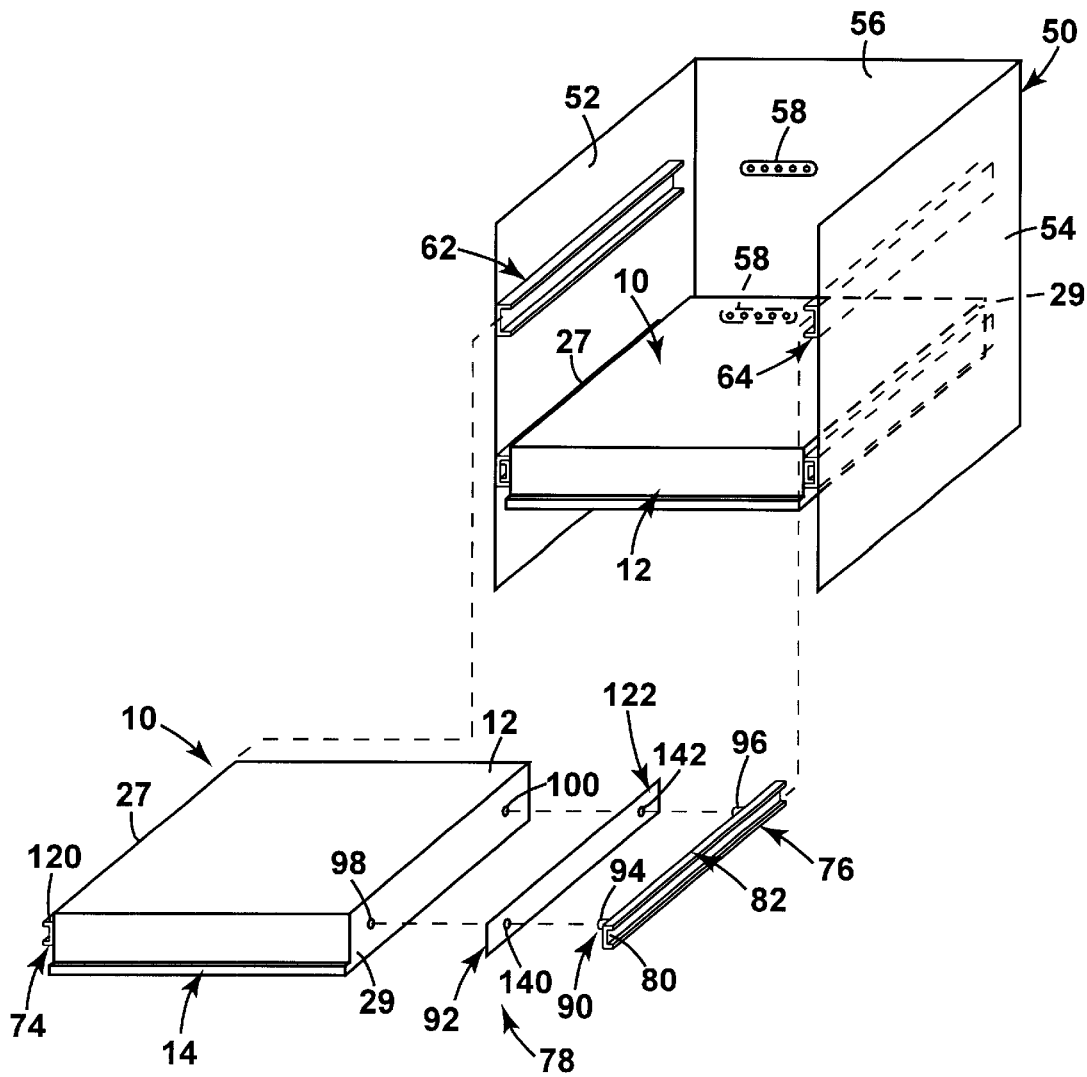
FIG. 2A is a perspective view of the hard disk drive of FIG. 1 shown supported within a chassis and illustrating the securing system according to an embodiment of the invention.
Figure 2B:
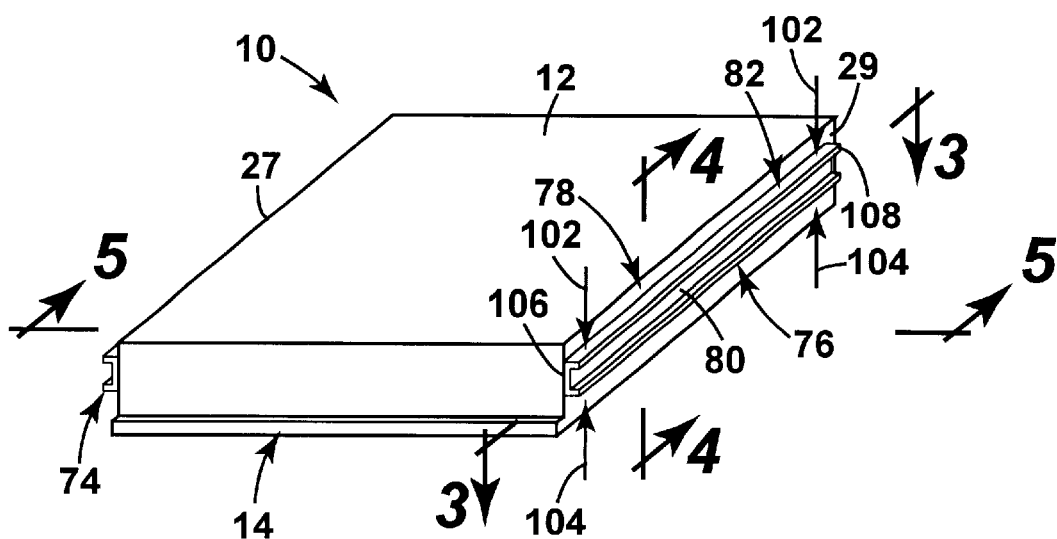
FIG. 2B is a perspective view of the hard disk assembly of FIG. 2 illustrating the securing system providing relative movement of the side rails with respect to the side walls in a direction generally parallel to the side walls.
Figure 2C:
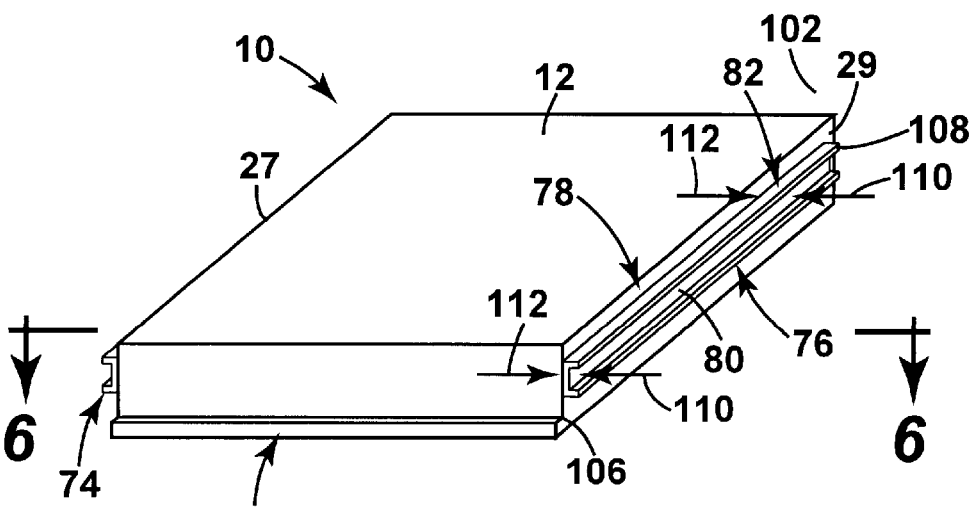
FIG. 2C is a perspective view of the hard disk assembly of FIG. 2 illustrating the securing system providing relative movement of the side rails with respect to the side walls in a direction generally orthogonal to the side walls.
Figure 4:
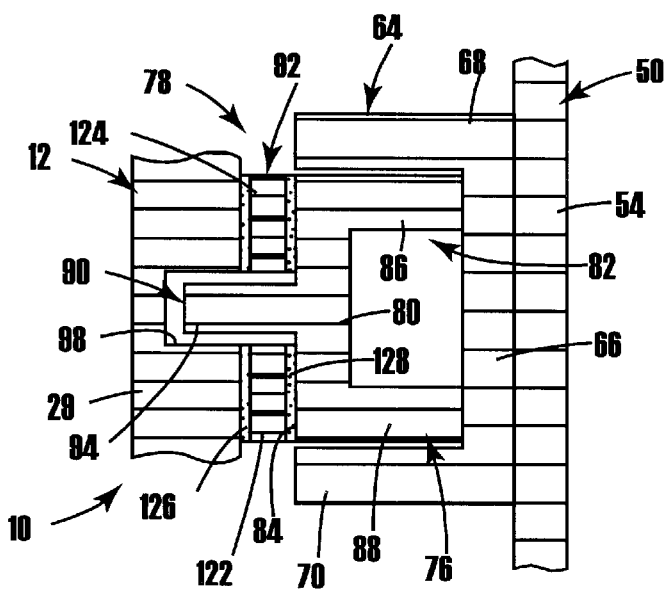
FIG. 4 is a partial sectional view of the securing system taken along line 4—4 in FIG. 2B.

Referring to FIGS. 2A–2C, the hard disk drive 10 is useable (i.e., mountable) in a chassis 50 that includes first and second U-shaped guide channels 62 and 64 mounted on first and second opposed side surfaces 52 and 54, respectively, of the chassis 50 for supporting the head disk assembly 12 within the chassis 50 and a motherboard, often referred to as a backplane board 56 as it is vertically mounted as a back wall of the computer chassis 50. The backplane board 56 includes a plurality of connectors 58 for releasably interconnecting with a mating connector 60 (see FIG. 1) along a rear edge of the printed circuit board assembly 14 of each of the hard disk drives 10. The first and second guide channels 62, 64 are preferably identical so only the second guide channel 64 will be described with particularity. With reference to FIG. 4, the U-shaped second guide channel 64 includes a chassis engaging main portion 66, an upper leg portion 68 and a lower leg portion 70. The first and second guide channels 62, 64 are secured to the side surfaces 52, 54 via suitable fasteners (not shown) that engage the main portions 66 of the guide channels 62, 64.

Referring to FIGS. 2A–2C, 3 and 4, hard disk drive 10 includes head disk assembly 12, first and second side rails 74 and 76, respectively, and a securing system 78 for securing the first and second side rails 74, 76 to the first and second side walls 27, 29 of the head disk assembly 12. Securing system 78 includes (1) suitable engagement means such as an engagement mechanism 90 protruding between first and second side rails 74, 76 and first and second side walls 27, 29 of head disk assembly 12, and (2) suitable double-sided adhesive resilient means such as double-sided adhesive resilient mechanism 92 adhesively attached between first side rail 74 and first side wall 27 and between second side rail 76 and second side wall 29 of head disk assembly 12. Securing system 78 provides for relative movement such as relative compliance between side rails 74, 76 and side walls 27, 29 to accommodate side rails 74, 76 engaging in guide channels 62, 64 in chassis 50. In one embodiment, the relative movement is a damped relative movement.

Figure 3:
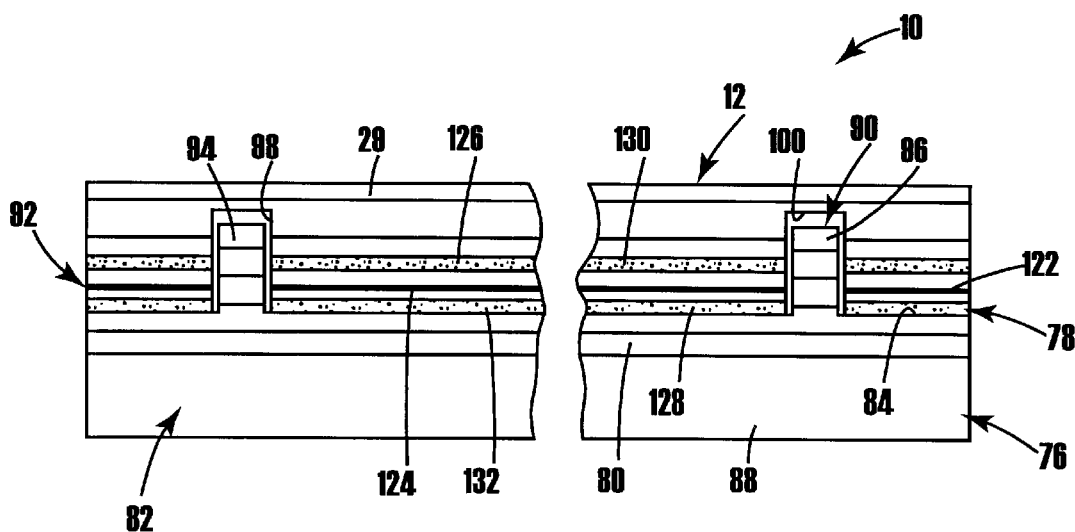
FIG. 3 is a partial sectional view of the securing system taken along line 3—3 in FIG. 2B.

The first and second side rails 74, 76 are preferably identical so only the second side rail 76 will be described with particularity. Referring to FIGS. 3 and 4, the second side rail 76 includes a base portion 80 and a guide channel engaging portion 82 which is integrally formed with the base portion 80. The base portion 80 has a head disk assembly mounting surface 84. The guide channel engaging portion 82 is defined by an upper leg segment 86 and a lower leg segment 88 that extend perpendicular to the base portion 80 and are parallel to one another. The guide channel engaging portions 82 of the first and second side rails are closely received within (i.e., engage) the U-shaped channels defined by the main and leg portions 66, 68, 70 of the first and second guide channels 62, 64.

The engagement mechanism 90 preferably includes first and second, identical, cylindrical engagement members 94 and 96 that protrude from and are integrally formed with the head disk assembly mounting surface 84 of the base portion 80 of each of the first and second side rails 74, 76. To mate with the first and second engagement members 94, 96, each of the first and second side walls 27, 29 of the head disk assembly 12 defines cylindrical engagement apertures 98 and 100. The first and second spaced engagement members 94, 96 of the first side rail 74 are adapted to engage the first and second engagement apertures 98, 100, respectively, of the first side wall 27 of the head disk assembly 12. The first and second spaced engagement members 94, 96 of the second side rail 76 are adapted to engage the first and second engagement apertures 98, 100, respectively, of the second side wall 29 of the head disk assembly 12. This cooperation of the engagement apertures 98, 100 with the engagement members 94, 96 can reduce the time for aligning the first and second side rails 74, 76 on the side walls 27, 29 of the head disk assembly 12. This alignment process includes engaging the engagement members 94, 96 with the engagement apertures 98, 100 to orient and align the side rails 74, 76 on the side walls 27, 29.

With reference to FIGS. 3 and 4, the engagement apertures 98, 100 are preferably slightly larger in size then the engagement members 94, 96 received therein. This allows the side rails 74, 76 to move slightly relative to the side walls 27, 29 of the head disk assembly 12 to accommodate the side rails 74, 76 engaging the guide rails 62, 64 of the chassis 50. In other words, by slightly oversizing the engagement apertures 98, 100, the engagement members 94, 96 can move relative to the apertures 98, 100, which thereby allows the side rails 74, 76 to move relative to the side walls 27, 29 so that the side rails 74, 76 can accommodate (i.e., tolerate) a minute amount of guide rail 62, 64 misalignment. Referring back to FIGS. 2B and 2C, each of the first and second side rails 74, 76 is independently movable relative to the respective side wall 27, 29 of the head disk assembly 12. As seen in FIG. 2B, each of the first and second side rails 74, 76 is movable in a first direction, represented by arrows 102, parallel to the side walls 27, 29, and in an opposite second direction represented by arrows 104, also parallel to the side walls 27, 29. In addition, the first and second side rails 74, 76 can also rotate slightly. In other words a proximal end 106 of the side rail 74, 76 can move in the direction of arrow 102 while a distal end 108 of the side rail 74, 76 can move in the opposite direction of arrow 104, and vice versa. As seen in FIG. 2C, each of the first and second side rails 74, 76 is also movable in a third direction, represented by arrows 110, perpendicular to the side walls 27, 29, and in an opposite fourth direction represented by arrows 112, also perpendicular to the side walls 27, 29. In addition, the first and second side rails 74, 76 can also rotate slightly in this plane. In other words the proximal end 106 of the side rail 74, 76 can move in the direction of arrow 110 while the distal end 108 of the side rail 74, 76 can move in the opposite direction of arrow 112, and vice versa.

Referring to FIG. 2A, the resilient mechanism 92 preferably includes a first double-sided adhesive resilient element 120 for mounting the first side rail 74 to the first side wall 27, and a second double-sided adhesive resilient element 122 for mounting the second side rail 76 to the second side wall 29. The first and second double-sided adhesive resilient elements 120, 122 are identical, so only the second double-sided adhesive resilient element 122 will be described with particularity. Referring to FIGS. 3 and 4, the second resilient element 122 includes a resilient substrate 124, a first adhesive material 126 and a second adhesive material 128. The resilient substrate 124 has a first side 130 and an opposite second side 132. In one preferred embodiment, the resilient substrate 124 is a resilient material such as foam that is capable of damping noise and vibration. The first adhesive material 126 is adhesively secured to the first side 130 of the resilient substrate 124 and the second adhesive material 128 is adhesively secured to the second side 132 of the resilient substrate 124. The first adhesive material 126 of the first and second resilient elements 120, 122 is adapted to adhesively engage the respective first and second side walls 27, 29 for securing the first and second double-sided resilient elements 120, 122 to the head disk assembly 12. The second adhesive material 128 of the first and second resilient elements 120, 122 is adapted to adhesively engage the respective mounting surfaces 84 of the base portions 80 of the first and second side rails 74, 76 for mounting the side rails 74, 76 to the side walls 27, 29 of the head disk assembly 12. In one preferred embodiment, the first and second adhesive materials 126, 128 are identical and are defined by a pressure sensitive adhesive material.

Figure 5:
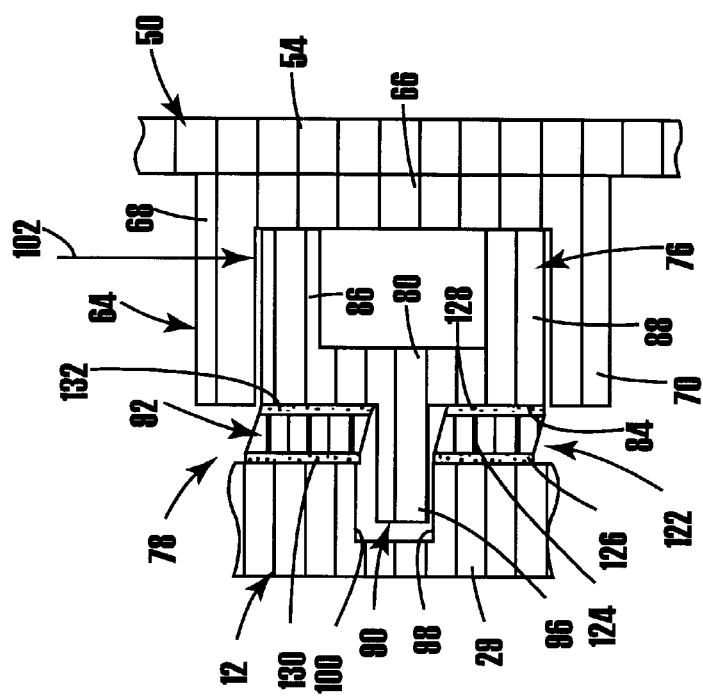
FIG. 5 is partial sectional view illustrating the securing system providing relative movement of the side rails shown in FIG. 2B taken along line 5—5 in FIG. 2B.
Figure 5:
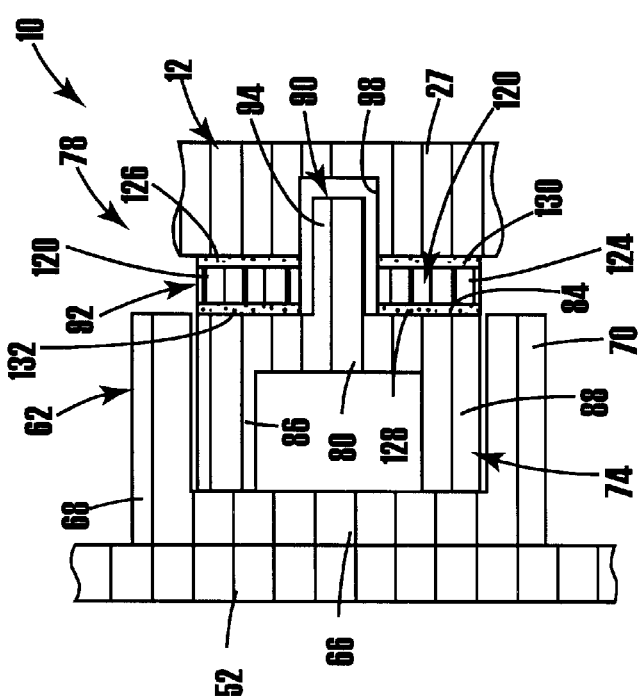

Referring back to FIG. 2A, each of the resilient elements 120, 122 includes first and second spaced through holes 140 and 142 for receiving the first and second engagement members 94, 96 of the respective first and second side rails 74, 76 for aligning the resilient elements 120, 122 with the side rails 74, 76. With reference to FIGS. 2A–2C, the resiliency of the resilient substrates 124 of the first and second resilient elements 120, 122 allows movement, as previously described, of the side rails 74, 76 relative to the side walls 27, 29 of the head disk assembly 12 (in the directions of arrows 102, 104, 110, 112) to accommodate misalignment of the guide channels 62, 64 while still ensuring that the side rails 74, 76 are adequately secured to the side walls 27, 29. In particular, FIG. 5 depicts movement of the second side rail 76 in the direction of arrow 102 to accommodate misalignment of the guide channel 64 relative to the guide channel 62. The resiliency of the resilient members 124 also prevents operation affecting and performance degrading "play" between the side rails 74, 76 and the guide channels 62, 64 since the resiliency of the resilient substrates forces the side rails 74, 76 into engagement with the guide channels 62, 64. Moreover, the resiliency of the resilient substrates 124 can isolate the head disk assembly 12 from shock and vibration that may otherwise be transmitted from other equipment through the chassis 50 to the hard disk drive 10. In addition, the resiliency of the resilient substrates 124 can dampen vibration and noise (i.e., buzzing sound) that may be produced by hard disk drive 10 and would otherwise be transmitted to other equipment through the chassis 50 (in the case of vibration) and/or to the ears of a user (in the case of noise).

Figure 6:
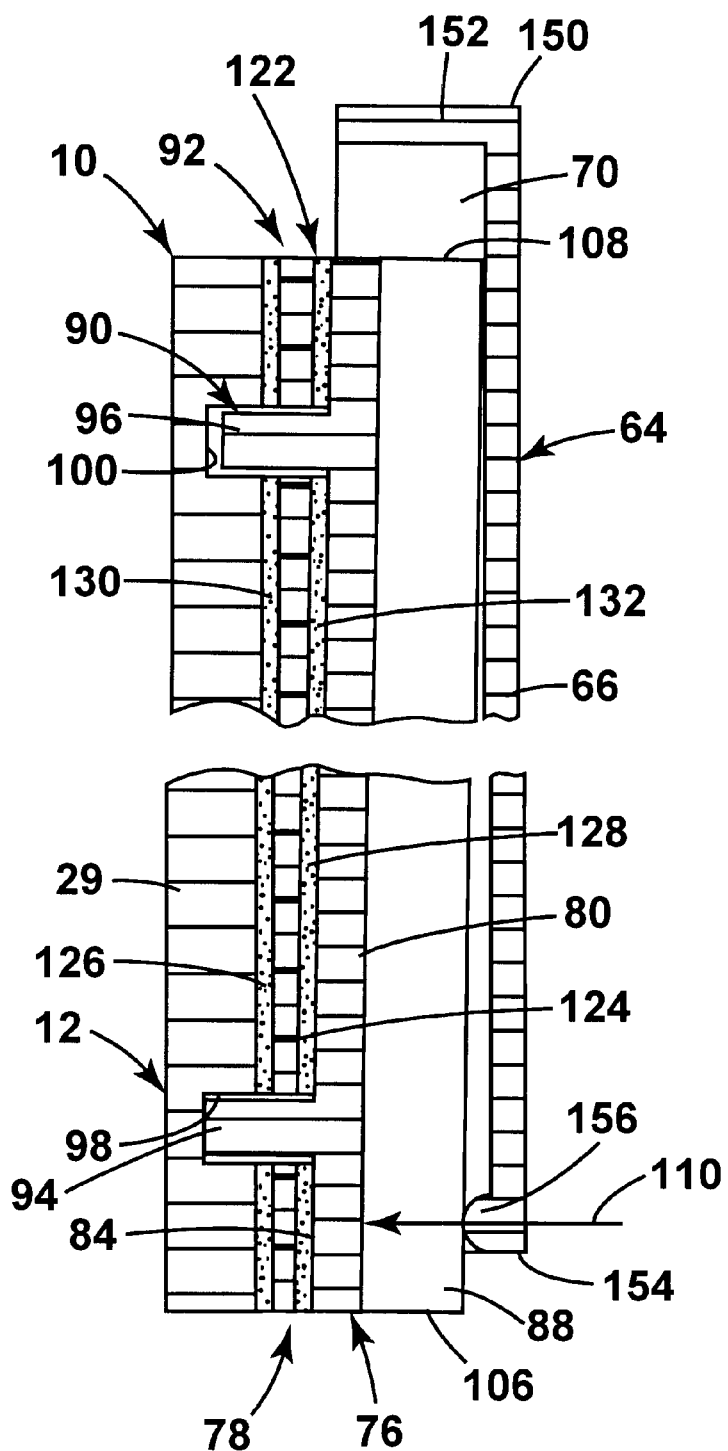
FIG. 6 is a partial sectional view taken along line 6—6 in FIG. 2C illustrating the securing system providing relative movement of the side rails shown in FIG. 2C and operation of a hard disk drive latching mechanism as the hard disk drive is partially inserted into the computer chassis.
Figure 7:
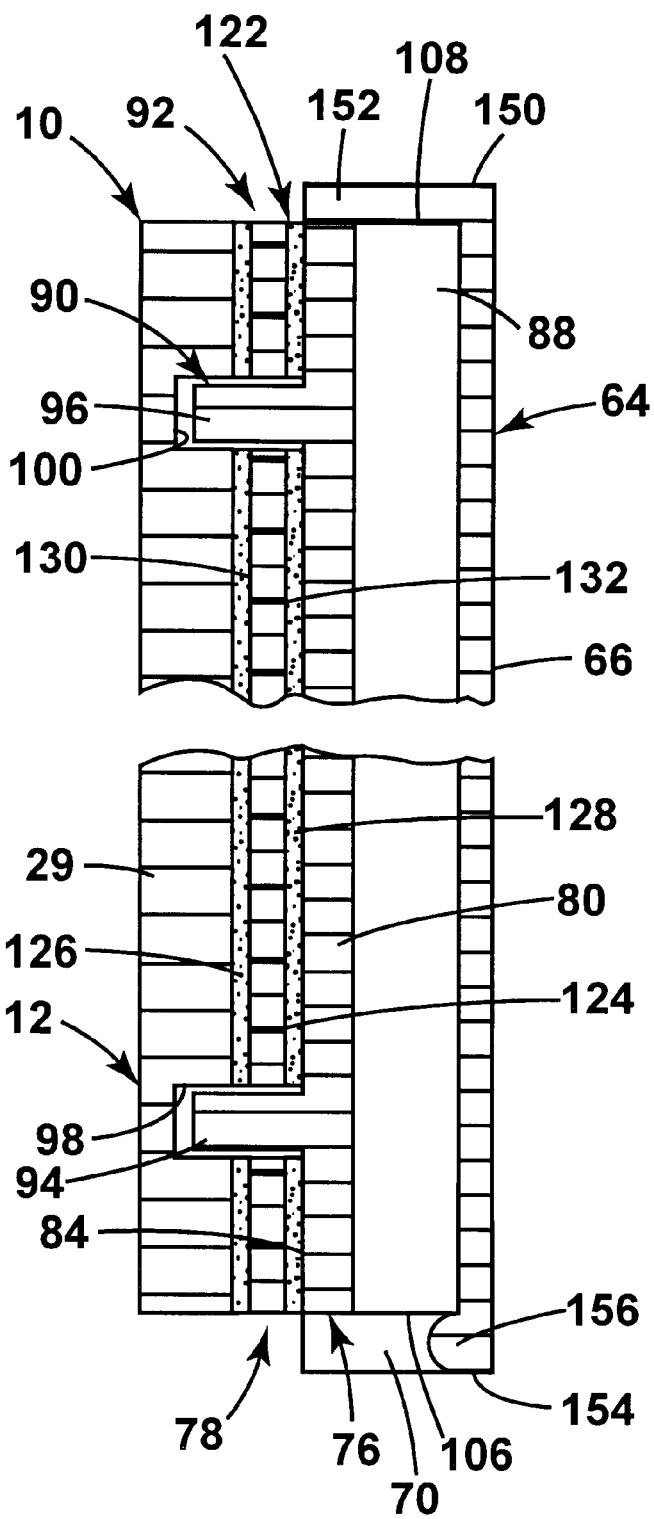
FIG. 7 is a partial sectional view similar to FIG. 6 illustrating the securing system providing relative movement of the side rails shown in FIG. 2C and operation of a hard disk drive latching mechanism with the hard disk drive fully inserted into the computer chassis.

Referring to FIGS. 6 and 7, a distal end 150 of each of the guide channels 62, 64 (since the guide channels 62, 64 are identical, only the guide channel 64 is shown) preferably includes a stop member 152, while a proximal end 154 of each of the guide rails 62, 64 includes a rounded ridge member 156. The ridge members 156 together with the stop members 152 define a latch mechanism for securing the hard disk drive 10 within the chassis 50 against inadvertent movement. As seen in FIG. 6, upon insertion of the hard disk drive 10 into the chassis 50, the resilient substrates 124 are compressed in the direction of arrow 110 as the side rails 74, 76 ride over and past the ridge members 156. As seen in FIG. 7, upon fill insertion of the hard disk drive 10 into the chassis 50, the resilient substrates 124 expand back to their original size and the side rails 74, 76 are trapped between the stop and ridge members 152, 156 of the guide channels so as to restrain the hard disk drive 10 within the chassis 50.

In summary, the engagement mechanism 90 and the double-sided adhesive resilient mechanism 92 of the securing device 78 employs less components and allows a hard disk drive assembler to quickly mount the side rails 74, 76 to the head disk assembly 12 resulting in assembly time and cost savings. In addition the side rail securing device 78 improves side rail to guide rail fit by virtually eliminating play between the side rails 74, 76 and the guide rails 62, 64 and acoustic energy. Moreover, the side rail securing device 78 is capable of accommodating (i.e., tolerating) some degree of guide rail and/or side rail misalignment (i.e., non-parallelism) so that the head disk assembly 12 can be easily inserted into the chassis 50 when this condition exists. Lastly, the side rail securing device 78 dampens vibration and isolates the head disk assembly 12 from vibration so that operation and performance of the head disk assembly 12 are not adversely affected.

We claim:

1. A disk drive for use in a chassis having first and second guide channels mounted on side surfaces of the chassis for supporting the disk drive within the chassis, the disk drive comprising:
    a head disk assembly including first and second side walls;
    first and second side rails for engaging the first and second guide channels, respectively, on the side surfaces of the chassis for supporting the disk drive within the chassis;
    a securing system for securing the side rails to the side walls, the securing system including:
        engagement means protruding between the first and second side rails and the first and second side walls, respectively, of the head disk assembly; and
        double-sided adhesive resilient means adhesively attached between the first side rail and the first side wall and between the second side rail and the second side wall for mounting the first and second side rails to the first and second side walls, respectively, of the head disk assembly;
    whereby the securing system provides for relative movement between the side rails and the side walls to accommodate the side rails engaging the guide channels in the chassis.

2. The disk drive of claim 1 wherein the securing system permits independent movement of each of the first and second side rails relative to the side walls of the head disk assembly.

3. The disk drive of claim 1 wherein the securing means permits independent movement of each of the first and second side rails relative to the side walls of the head disk assembly in a direction substantially perpendicular to the side walls.

4. The disk drive of claim 3 wherein the securing means permits further independent movement of each of the first and second side rails relative to the side walls of the head disk assembly in a further direction substantially parallel to the side walls.

5. The disk drive of claim 1 wherein the double sided adhesive resilient means reduces shock and vibration transmitted from the chassis to the head disk assembly.

6. The disk drive of claim 1 wherein adhesive of the double-sided adhesive resilient means is a pressure sensitive adhesive material.

7. The disk drive of claim 1 wherein the double-sided adhesive resilient means for mounting the first and second side rails to the first and second side walls includes:
    a first double-sided adhesive resilient element for mounting the first side rail to the first side wall of the head disk assembly; and a second double-sided adhesive resilient element for mounting the second side rail to the second side wall of the head disk assembly.

8. The disk drive of claim 7 wherein adhesive of each of the first and second double-sided adhesive resilient elements is a pressure sensitive adhesive material.

9. The disk drive of claim 7 wherein each of the first and second side rails includes:

a base portion having a head disk assembly mounting surface; and a guide channel engaging portion coupled to the base portion.

10. The disk drive of claim 9 wherein each of the first and second double-sided adhesive resilient elements includes:

a resilient substrate having a first side and an opposite second side;

a first adhesive material on the first side of the substrate, the first adhesive material of the first and second double-sided adhesive resilient elements being adapted to adhesively engage the first and second side walls for securing the first and second double-sided adhesive resilient elements to the head disk assembly; and a second adhesive material on the second side of the substrate, the second adhesive material of the first and second double-sided adhesive resilient elements being adapted to adhesively engage the head disk assembly mounting surfaces of the base portions of the first and second side rails for mounting the side rails to the first and second side walls of the head assembly.

11. The disk drive of claim 10 wherein the first adhesive material is identical to the second adhesive material.

12. The disk drive of claim 11 wherein the first and second adhesive materials are each a pressure sensitive adhesive material.

13. The disk drive of claim 10 wherein the substrate of each of the first and second double sided adhesive resilient elements is a resilient material that is capable of damping vibration and noise produced by the head disk assembly.

14. The disk drive of claim 13 wherein the resilient material is foam.

15. The disk drive of claim 10 wherein the engagement means ensures that the first and second side rails are positioned on the first and second side walls of the head disk assembly such that the first side rail is substantially parallel to the second side rail.

16. The disk drive of claim 15 wherein each of the first and second side walls of the head disk assembly defines first and second spaced engagement apertures, and wherein the engagement means includes:

first and second spaced engagement members protruding from the head disk assembly mounting surface of the base portion of each of the first and second side rails, the first and second spaced engagement members of the first side rail being adapted to engage the first and second engagement apertures, respectively, of the first side wall of the head disk assembly, and the first and second spaced engagement members of the second side rail being adapted to engage the first and second engagement apertures, respectively, of the second side wall of the head disk assembly for aligning the first and second side rails to the head disk assembly and to each other.

17. The disk drive of claim 16 wherein each of the first and second double-sided adhesive resilient elements defines first and second spaced through holes for receiving the first and second engagement members of a respective one of the first and second side rails for aligning the first and second double-sided adhesive resilient elements with the first and second side rails, respectively.

18. The disk drive of claim 16 wherein the first engagement member is identical to the second engagement member.

19. The disk drive of claim 16 wherein the base portion, the guide channel engaging portion and the first and second engagement members of each of the first and second side rails are all integrally formed with one another.

20. The disk drive of claim 10, and further including:

a latch mechanism for securing the side rails to the guide rails such that the head disk assembly is secured within the chassis against inadvertent movement.

21. The disk drive of claim 10 wherein the latch mechanism includes:

a stop member at a distal end of each of the first and second guide channels; and a ridge member at a proximal end of each of the first and second guide channels;

whereby upon insertion of the head disk assembly into the chassis, the resilient substrates are compressed allowing the first and second side rails to ride over and past the ridge members such that upon fall insertion of the head disk assembly in the chassis the first and second side rails are trapped between the stop and ridge members of the guide channels so as to secure the head disk assembly within the chassis against inadvertent movement.

* * * * *